A. H. JONES.
ROLLER BEARING AND METHOD OF MAKING THE SAME.
APPLICATION FILED DEC. 10, 1918.
1,343,885.
Patented June 15, 1920.
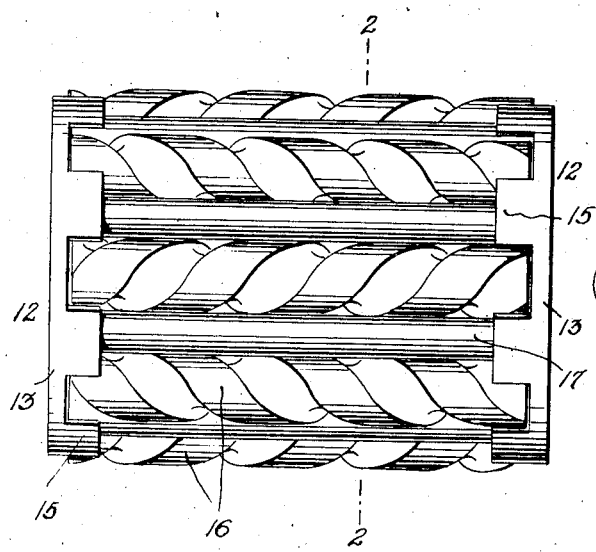
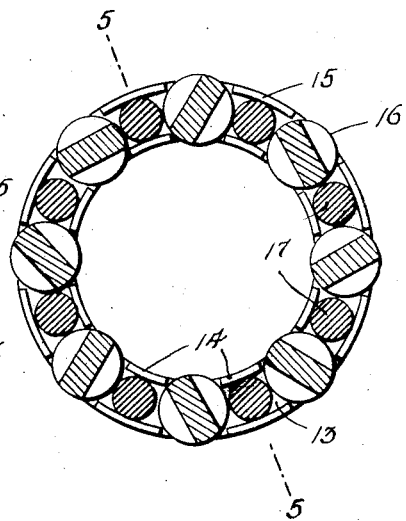
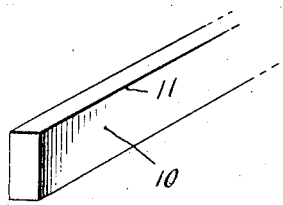
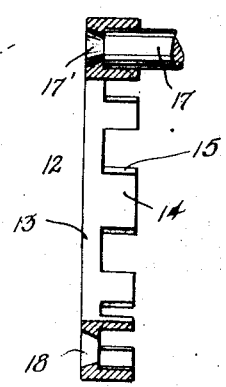
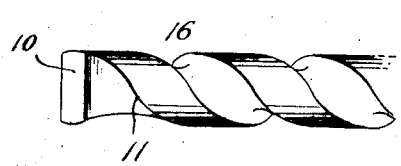
WITNESSES
H. J. Walker
Geo. H. Beeler
INVENTOR
A. H. Jones
BY Munn & Co
ATTORNEYS

UNITED STATES PATENT OFFICE.

ALLEN H. JONES, OF BELLEVILLE, NEW JERSEY.

ROLLER-BEARING AND METHOD OF MAKING THE SAME.

1,343,885.  Specification of Letters Patent.  Patented June 15, 1920.

Application filed December 10, 1918. Serial No. 266,105.

*To all whom it may concern:*

Be it known that I, ALLEN H. JONES, a citizen of the United States, and a resident of Belleville, in the county of Essex and State of New Jersey, have invented a new and Improved Roller-Bearing and Method of Making the Same, of which the following is a full, clear, and exact description.

This invention relates to the construction of roller bearings as distinguished from ball bearings and has particular reference to the form and method of making the rollers constituting the anti-friction elements of such bearings.

Among the specific objects of my improved method of making roller bearing rollers is to provide a roller in which the grain or fiber of the metal extends as nearly as possible parallel to the direction of rolling action of such elements in practice, whereby the likelihood of chipping, flaking, or crushing of the rollers will be reduced to a minimum or practically eliminated.

Another object of the invention is to provide a roller bearing element having a solid core or center and integral spiral rolling contact surfaces.

A further object of the invention is to provide an anti-friction roller formed of a solid bar of metal, or its equivalent, by an act of twisting the bar.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a cylinder bearing made in accordance with my invention.

Fig. 2 is a vertical transverse sectional view on the line 2—2 of Fig. 1.

Fig. 3 is a detail perspective view of a bar of material prior to its formation into a roller.

Fig. 4 is another detail view indicating the twisted form of said bar prior to the completion of the roller; and Fig. 5 is a fragmentary longitudinal section on the line 5—5, Fig. 2, showing especially the manner of construction of the cage.

I am aware that bearing rollers have been made heretofore having spiral character, but ordinarily such bearings are hollow and more or less flexible as distinguished from my improved solid bearings. In the more common form, however, of bearing rollers the elements are made straight and solid while their bearing surfaces have the grain or fiber of the metal substantially parallel to the axes and the lines of contact between the parts anti-frictionally separated by the rollers. In other words in the use of a simple cylinder as a bearing roller the two lines of contact between the roller and the two parts separated thereby are not only parallel to each other, but determine an imaginary rectangular plane passing through the axis of the roller and also determining a plane of cleavage which in the crushing of the roller due to excessive pressure thereon splits the roller into two equal parts, the fiber or grain of each part being entirely independent of the other part. If for instance a bearing roller be made of wood having its grain straight and running parallel with its axis it is plainly to be seen that a crushing strain applied to the roller would readily split the same lengthwise in directions parallel to its grain. The same facts apply to the ordinary cylindrical or conical rollers. Whereas in the known form of spiral rollers, made of relatively thin or strap metal, such rollers are relatively weak and unable to withstand crushing strains, my rollers are so constructed as to possess maximum resistance to all crushing, chipping, splitting, or flaking tendencies.

Again, in my improved process or method of making bearing rollers, either of cylindrical or conical form, I make the rollers from bar metal, rectangular in cross section, preferably oblong as shown at 10 in Fig. 3, and impart thereto a direct twisting action which may be done while the metal is cold. As shown in Fig. 4 as well as in Figs. 1 and 2, the bar after being twisted assumes naturally as a result of the twisting action a curved contour at its bearing surface.

With the bar 10 so rolled or formed in its manufacture as to have the grain or fiber of the metal lengthwise, it is obvious that such grain or fiber will be caused to assume in the twisted bar of Fig. 4 the same position with respect to the bar as a whole, that is to say considering any edge 11 of the bar such edge in the twisted bar assumes a spiral as indicated in Fig. 4 and the grain or fiber of the bar will not be broken or disturbed by the act of twisting. Metal bars may be rolled or formed by other means in substantially predetermined measurements, and when made of a good quality of steel or other material may be twisted in long bars or strips with such precision that the effective rolling diameter thereof will remain practically uniform throughout. After the bar is twisted it may be cut into roller lengths by any suitable device such as a hacksaw, and hence with but a slight amount of surface grinding they will be ready for assemblage into roller bearings.

Any suitable means may be provided to hold a series of rollers in assembled position as a unitary bearing. For this purpose I provide a cage which for the purpose of assembling cylinder bearings comprises end pieces or rings 12 which are formed preferably of sheet metal so cut and stamped as to include a flat annulus 13 and inner and outer circular series of lugs 14 and 15 respectively. Each lug is formed integral with the annulus 13 and is bent to assume a position perpendicular thereto or parallel to the axis of the finished bearing unit. The diametrical width of the annulus is preferably slightly less that the diameter of a roller 16, and the circumferential spacings between lugs in the same series is such that when the ends of the rollers 16 are extended into such spaces the rollers will be held from lateral displacement, but will be free to rotate around their own axes. Any suitable means such as bars 17 extending between the end pieces 12 may be employed to hold them in fixed rigid position with respect to each other and the rollers journaled therein. As shown in Fig. 5 the ends of the bars are reduced at 17' and fitted in countersunk holes 18 formed in each annulus 13. It is to be understood that the spacing between adjacent bars 17 shall be ample to insure free rotation of the rollers without material resistance from any cause. I wish to point out also that the length of the lugs 14 and 15 in a direction parallel to the axis of the unit should be sufficient to insure that some part of the active bearing surface of each roller will engage with such lugs in order to prevent lateral displacement of the rollers when the bearing as a unit is being manipulated apart from its active setting.

In the formation of a roller from a bar of solid metal of oblong rectangular form in cross section as shown in Fig. 3, the narrow or edge portions of the bar naturally are caused to assume two parallel spiral contact zones or surfaces while the broader or side portions of the ordinary bar are simultaneously caused to assume rounded bottom grooves between said bearing zones or edges. These grooves may serve as oil conveyers, but in any event will always serve to cause the automatic cleansing of the bearing from dust, dirt, or any other matter that would tend to be abrasive in its action. Each roller in other words acts as a spiral conveyer causing the delivery from the end of the roller of any extraneous matter that would tend to interfere with the proper action of the bearing. While the rollers may be twisted in either direction I find it best in practice to have them arranged alternately as "rights" and "lefts" so that a better distribution of oil, if used, will be realized, and with respect to the cleansing action above described the effete matter would be discharged at both ends of the cage.

I claim:

A solid main load supporting bearing roller comprising a twisted solid bar of metal of rectangular oblong cross section throughout its length, said bar being twisted throughout its length.

ALLEN H. JONES.